Figure 1:
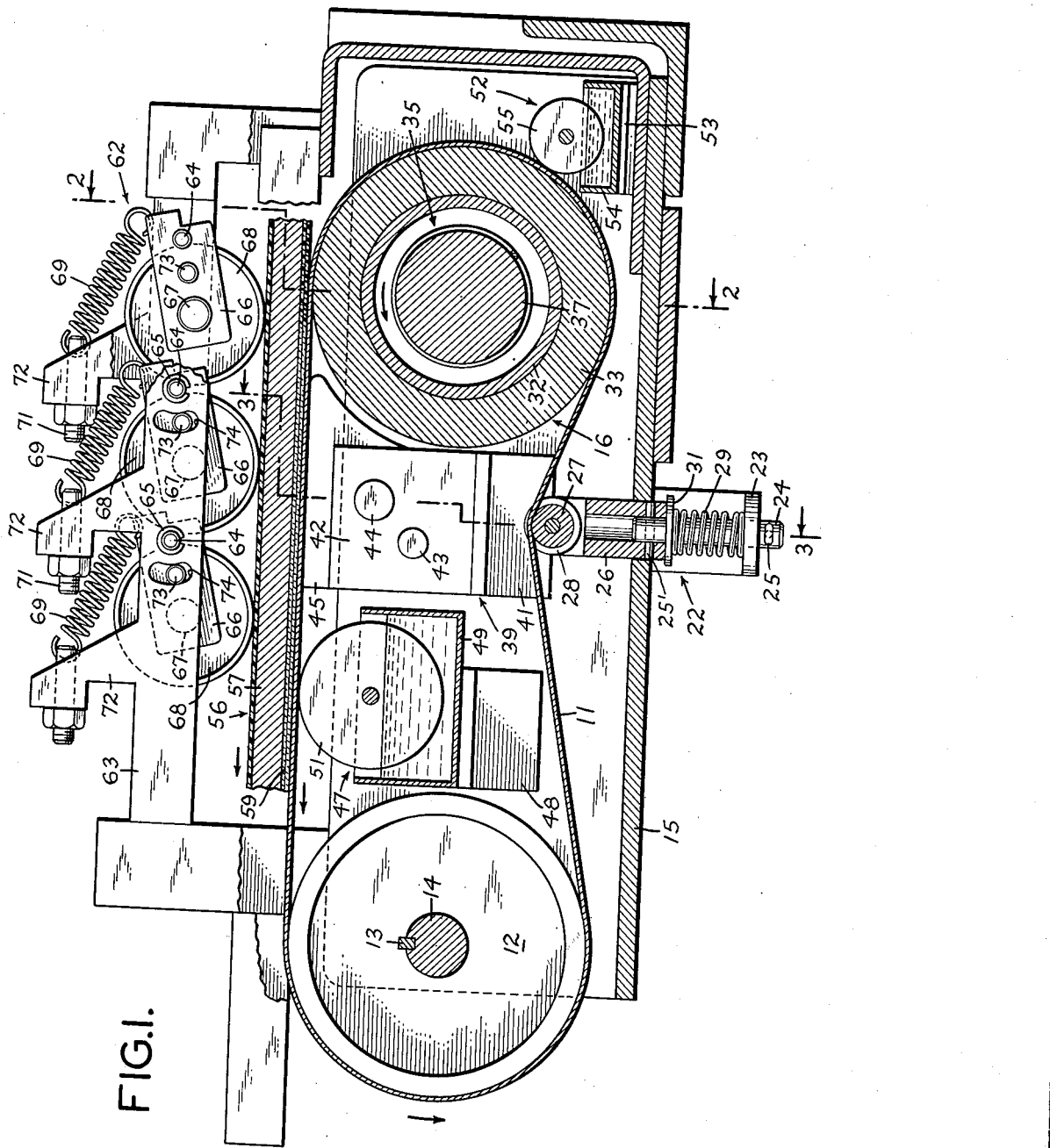

June 8, 1954

R. E. STANTON 2,680,470

HEAT SEALING MACHINE

Filed Jan. 28, 1953

2 Sheets-Sheet 1

INVENTOR.
ROBERT E. STANTON
BY
ATTORNEYS.

June 8, 1954

R. E. STANTON 2,680,470

HEAT SEALING MACHINE

Filed Jan. 28, 1953

2 Sheets-Sheet 2

INVENTOR.
ROBERT E. STANTON
BY
ATTORNEYS.

Patented June 8, 1954

2,680,470

UNITED STATES PATENT OFFICE 2,680,470

HEAT SEALING MACHINE

Robert E. Stanton, Bloomfield, N. J., assignor to Celanese Corporation of America, New York, N. Y., a corporation of Delaware Application January 28, 1953, Serial No. 333,729

9 Claims. (Cl. 154—42)

This invention relates to heat sealing and relates more particularly to an improved process and apparatus for the heat sealing of relatively thin films to one another.

The heat sealing of relatively thin films, comprising a thermoplastic material such as cellulose acetate or other organic acid ester of cellulose, to one another presents a number of difficulties. In order to obtain an adequate seal between such films it is necessary to heat the same to an elevated temperature to soften the thermoplastic material, and to apply sufficient pressure to the heated films to produce an autogenous bond therebetween. At the elevated temperatures necessary to produce the bond, it is found that the thermoplastic material tends to adhere to the heating elements and to the pressure applying elements. As a result, when an attempt is made to separate the said elements from the films, distortion and/or tearing of the films may occur. In addition, the films are relatively weak at the temperatures needed to obtain the seal therebetween so that the pressure applied thereto will frequently cause distortion and/or tearing of the films.

It is an important object of this invention to provide a process and apparatus for the heat sealing or relatively thin films to one another which will be free from the foregoing and other difficulties and which will be especially efficient in operation and relatively simple in construction.

A further object of this invention is to provide a process and apparatus for the heat sealing of relatively thin films to one another which will keep the distortion and/or tearing of the said films to a minimum.

Other objects of this invention will be apparent from the following detailed description and claims.

According to the present invention, there is provided a heat sealing apparatus comprising an endless flexible belt which is trained around a pair of rotatable pulleys, at least one of which is positively driven to effect movement of the belt through the apparatus. There is also provided means for heating the longitudinal central portion only of said belt to an elevated temperature. For example, one of the pulleys around which the belt is trained may include a heating means for raising the belt to an elevated temperature. To this end the pulley may be provided intermediate its edges with a peripheral rib narrower than said belt, against which rib the belt bears. The heat transmitted from the heating element through the rib to the belt will raise the central portion of said belt to an elevated temperature, leaving the portions adjacent the edges of said belt at a relatively lower temperature. The belt may also travel over a heating shoe which is provided with a rib narrower than said belt so that only the central portion of the belt will contact said rib. The heating shoe is equipped with heating means and the heat transmitted from said means through the rib to the belt will act to maintain the central portion of the belt at an elevated temperature.

The films that are to be sealed to one another, which films may, for example, be the wrapping of a package, are placed on said belt so that the area to be sealed contacts the heated central portion of said belt, and the films are urged against said belt by suitable pressure means. The pressure means may comprise a plurality of rollers that are spring-pressed toward said belt and urge the films that are to be heat sealed into intimate contact with said belt. Through the combined action of heat and pressure, the material of the films will be brought to a plastic state and will be joined together to form a bond. There is little or no tendency for any distortion and/or tearing of the films to take place during the operation because, while pressure is applied to the entire area of the belt only the central portion of the belt, and the film material in contact therewith, are heated to a temperature high enough to produce a bond. The edges of the belt, and the film material in contact therewith, are at a much lower temperature at which lower temperature the strength of the film material is sufficiently high to support the belt without damage, and to maintain that portion of the film material which is at a higher temperature relatively smooth and flat.

The films being heat sealed are then moved, together with the belt, away from the heating means and a cooling liquid is applied to said belt to reduce its temperature rapidly and efficiently. The cooling of the belt will cool the heated film material causing the same to set to form a strong bond. The nature of the liquid used for cooling the belt is not critical, water being suitable for this purpose. The films having the seal therebetween may then be removed from contact with the belt. Because the belt and the film material are at a relatively low temperature when they are separated, there is little or no tendency for the film to stick to the belt and little or no tendency for the film to be distorted or torn during such removal.

The belt may be formed of a suitable flexible metallic material, preferably one that is resistant to corrosion, such as phosphor bronze or the like. In this case it may be desirable to apply to the belt a thin film of a substance, such as silicone oil, to which the heated film material does not adhere, to eliminate any tendencies for the heated film to adhere to said belt. Alternatively, the belt may be non-metallic, and may, for example, be woven of fibers formed of glass or other material resistant to heat. In this case, the belt may be impregnated with a substance resistant to heat and to which the heated film will not adhere such as, for example, polytetrafluoroethylene. When a non-metallic belt is employed, it is necessary to raise the heating means to a higher temperature then is necessary when a metallic belt is used, since the non-metallic belt exhibits a lower heat conductivity.

While the process and apparatus of this invention are applicable generally to the heat sealing of films, they are particularly useful in the heat sealing of films comprising a thermoplastic substance such as cellulose acetate or other organic acid ester of cellulose.

Figure 2:
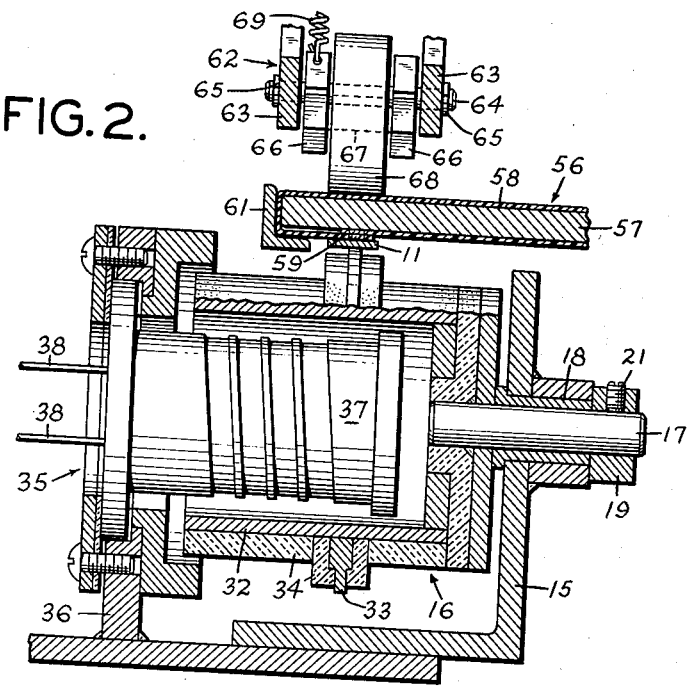
Figure 3:
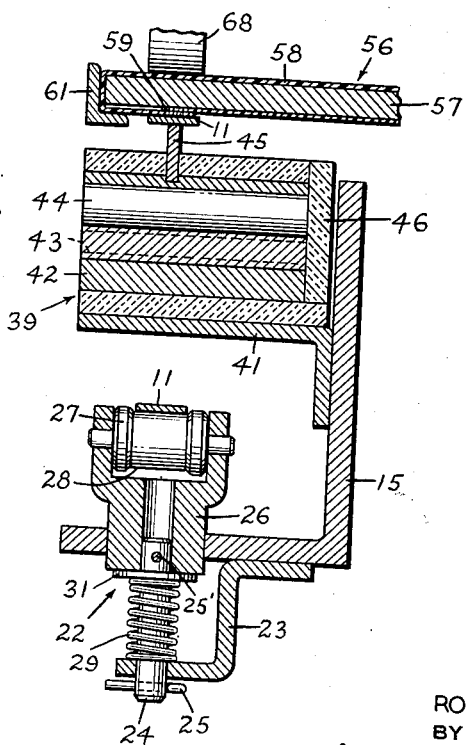

A preferred embodiment of this invention is shown in the accompanying drawings wherein, Fig. 1 is a side elevational view, partly in section, of the sealing apparatus, Fig. 2 is a cross-sectional view, taken on the line 2—2 in Fig. 1 in the direction of the arrows, and Fig. 3 is a cross-sectional view, taken on the line 3—3 in Fig. 1 in the direction of the arrows.

Referring now to the drawings, the reference numeral 11 designates an endless flexible belt which is trained around a pulley 12 fastened by means of a key 13, to a shaft 14 that is journalled for rotation in machine frame 15 and is driven by any suitable means, not shown, to cause the pulley 12 to rotate in a counterclockwise direction and the upper portion of the belt 11 to move from right to left as shown in Fig. 1 of the drawings. The belt 11 is also trained around an annular idler pulley 16, indicated generally by reference numeral 16, which is mounted on a stub shaft 17 journalled for rotation in a bushing 18 supported by the machine frame 15. The stub shaft 17 is held securely in place by means of a collar 19 that is fastened to said shaft by a set screw 21. To keep the belt 11 taut at all times, there is provided a slack take-up device, indicated generally by reference numeral 22, mounted on bracket 23 depending from the machine frame 15. The slack take-up device 22 comprises a rod 24, extending through the bracket 23, which rod 24 is held in place by means of a cotter pin 25. Firmly attached to the rod 24 by means of a pin 25' and slidably mounted within a hole provided in the machine frame 15 is a yoke 26 which carries at its upper end a rotatable pulley 27 having therein a groove 28 in which the belt 11 rides. The yoke 26 is urged upwardly against the belt 11 to eliminate any slack therefrom by means of a helical spring 29 which encircles the rod 24 and which is held under compression between the bracket 23 and a washer 31 which bears against the yoke 26.

The annular pulley 16 functions to heat the central portion only of belt 11 and comprises a metallic sleeve 32 having a rib 33 extending around the periphery thereof. The rib 33 acts to support the belt 11 but, as shown in the drawing, is narrower than said belt. The sleeve 32 and the sides of the rib 33 are covered with thermal insulation 34 to minimize the loss of heat therefrom. To raise the annular pulley 16 to the desired temperature for the heat sealing operation, there is provided within the sleeve 32 a heating assembly, indicated generally by reference numeral 35. The heating assembly 35 comprises an upright 36 fastened to the machine frame 15, which upright carries a cylindrical electric heater 37 to which current is supplied through leads 38 and which extends into the interior of the annular pulley 16.

Positioned adjacent the annular pulley 16 is a heating shoe, indicated generally by reference numeral 39, which is supported on a bracket 41 fastened to the machine frame 15. The heating shoe 39 comprises a metallic block 42 in which is embedded an electric heating element 43 and a thermostat 44. Secured to and extending upwardly from the block 42 is a rib 45 which is narrower than the belt 11 and upon which the said belt rides. The rib 45 is contoured to the shape of the pulley 16 so that as the belt 11 leaves the pulley 16 it will contact the rib 45 before any significant cooling thereof can occur. To minimize the loss of heat from the shoe 39, the block 42 is covered with thermal insulation 46. The shoe 39 is positioned so that the upper surface of the rib 45 is at a slightly higher level than the top of the annular pulley 16 to insure that the belt 11 will remain in contact with said ribs at all times.

After the belt 11 leaves the rib 45 it travels to a cooling device indicated generally by reference numeral 47, which is supported on a bracket 48 fastened to the machine frame 15. The cooling device 47 comprises a trough 49 having a cooling liquid therein and a rotatably mounted furnishing roller 51 which dips into the said liquid and bears against the undersurface of the belt 11. As the belt 11 moves through the apparatus it will cause the roller 51 to rotate so as to carry cooling liquid from the trough 49 to the said belt whereby the belt 11 will be cooled rapidly and efficiently.

There may also be provided in the apparatus, means, indicated generally by reference numeral 52, supported on a bracket 53 fastened to the machine frame 15, for applying to the surface of the belt a suitable material for reducing the tendency of the belt 11 to stick to the heated thermoplastic material. The means 52 comprises a trough 54 holding a supply of the said material and a rotatably mounted furnishing roller 55 which dips into the said trough and bears against the belt 11 as the said belt rests against the pulley 16. The movement of the belt 11 will cause the roller 55 to rotate so as to carry the material from the trough 54 to the said belt.

A package, indicated generally by reference numeral 56, comprising an article 57 enclosed in a wrapping material 58, whose free edges are overlapped, as at 59, is moved through the apparatus together with the belt 11. The package 56 bears against a combined support and edge guide 61 which is positioned so that the overlap 59 rests directly on the belt 11. As it moves through the apparatus, the package 56 is urged against the belt 11 by means of a pressure assembly, indicated generally by the reference numeral 62. The pressure assembly 62 comprises a pair of spaced, parallel straps 63 supported by the machine frame 15, between which straps 63 there are pivotally mounted, on stub shafts 64, held in place by split rings 65, three pairs of arms 66. Mounted for rotation between the pairs of arms 66 on shaft 67 are rollers 68 that bear against the package 56. The wheels 68 are urged against the package 56 by means of helical springs 69 that are fastened under tension between the ends of the arms 66 and adjustable bolts 71 threaded through uprights 72 that extend from the straps 63. The tension in the springs 69 tends to rotate the pairs of arms 66 about the pivot 64 in a counterclockwise direction, as seen in Fig. 1 of the drawings, to press, through rollers 68, the package 56 against the belt 11. To guide the movement of the pairs of arms 66, there are provided pins 73 that project outwardly from said arms and ride in arcuate slots 74 in the straps 63.

During operation, the package 56 is placed on the belt 11, to which a thin film of silicone oil, for example, has been applied by the means 52, so that the overlap 59 rests directly on the said belt. The package 56 will move through the apparatus together with the belt 11 so that there will be no relative motion between the two and will be urged against the said belt by the pressure assembly 62. When the belt 11 first contacts the overlap 59, the central portion of said belt will have been heated to an elevated temperature by contact with the rib 33 extending from the annular pulley 16 and said center portion will be held at an elevated temperature as it moves over the rib 45 extending from the heating shoe 39. Through the combined action of the pressure of the assembly 62 and the heat of the belt 11, the thermoplastic material in the overlap 59 of the wrapping material 58 will be fused to form an autogenous bond. The package 56 will then move, together with the belt 11, away from the heating shoe 39 to the cooling device 47 wherein the temperature of the belt 11 will be reduced sharply, thereby cooling the thermoplastic material in the overlap 59 to a relatively low temperature so that the said thermoplastic material will harden to form a strong bond. The package 56 will then move out from under the pressure assembly 62 and may be carried away from the apparatus in any suitable manner. Because only the central portion of the belt 11 is heated to a high temperature, and the edges of said belt are at a much reduced temperature there is little or no tendency for the pressure applied to form the seal to cause distortion and/or tearing of the wrapping material 58. In addition, because there is no relative movement between the belt 11 and the seal while the thermoplastic material in said seal is at an elevated temperature, the tendency of such movement to cause distortion and/or tearing of the thermoplastic material in the seal is eliminated. The apparatus of this invention, accordingly, produces a strong heat seal in the wrapping material which is relatively free from distortion and tearing and enjoys a high degree of consumer acceptance.

It is to be understod that the foregoing detailed description is given merely by way of illustration and that many variations may be made therein without departing from the spirit of my invention.

Having described my invention, what I desire to secure by Letters Patent is:

1. Apparatus for heat sealing thin films, comprising a belt, drive means for moving the belt through the apparatus, pressure means for urging the films to be sealed against one face of the belt, heating means for raising the temperature of the belt and the films in contact therewith to the sealing temperature, and cooling means for applying a liquid to the face of the belt opposite the face of the belt contacted by the films for cooling the belt and the films quickly.

2. Apparatus for heat sealing thin films, comprising a belt, drive means for moving the belt through the apparatus, pressure means for urging the films to be sealed against one face of the belt, heating means acting through the other face of the belt for raising the temperature of the central portion only of the belt and the films in contact therewith to the sealing temperature, and cooling means for applying a liquid to the face of the belt opposite the face of the belt contacted by the films for cooling the belt and the films quickly.

3. Apparatus for heat sealing thin films, comprising a metallic belt, drive means for moving the belt through the apparatus, means for applying to the surface of the belt a material to which the heated films will not adhere, pressure means for urging the films to be sealed against the face of the belt against which the said material has been applied, heating means acting through the other face of the belt for raising the temperature of the belt and the films in contact therewith to the sealing temperature, and cooling means for applying a liquid to the face of the belt opposite the face of the belt contacted by the films for cooling the belt and the films quickly.

4. Apparatus for heat sealing thin films, comprising an endless flexible belt, a pair of pulleys around which the belt is trained, driving means for at least one of said pulleys for moving the belt through the apparatus, pressure means for urging the films to be sealed against one face of the belt, a rib narrower than the belt extending around the periphery of one of the pulleys for contacting and supporting the belt, and heating means in said pulley for raising the temperature of the rib whereby the central portion only of the belt and the films in contact therewith are raised to the sealing temperature.

5. Apparatus for heat sealing thin films, comprising an endless flexible belt, a pair of pulleys around which the belt is trained, driving means for at least one of said pulleys for moving the belt through the apparatus, pressure means for urging the films to be sealed against one face of the belt, a rib narrower than the belt extending around the periphery of one of the pulleys for contacting and supporting the belt, heating means in said pulley for raising the temperature of the rib whereby the central portion only of the belt and the films in contact therewith are raised to the sealing temperature, and a heating shoe having a rib narrower than the belt positioned next to the heated pulley whereby to maintain the central portion only of the belt and the films in contact therewith at the sealing temperature.

6. Apparatus for heat sealing thin films, comprising an endless flexible belt, a pair of pulleys around which the belt is trained, driving means for at least one of said pulleys for moving the belt through the apparatus, pressure means for urging the films to be sealed against one face of the belt, a rib narrower than the belt extending around the periphery of one of the pulleys for contacting and supporting the belt, heating means in said pulley for raising the temperature of the rib whereby the central portion only of the belt and the films in contact therewith are raised to the sealing temperature, and a rotatable roll dipping into a trough of cooling liquid and contacting the face of the belt opposite the face of the belt contacted by the films at a point after the belt leaves the heated pulley whereby the movement of the belt will cause the roll to rotate to carry liquid from the trough to the belt for cooling the films quickly.

7. Apparatus for heat sealing thin films, comprising an endless flexible belt, a pair of pulleys around which the belt is trained, driving means for at least one of said pulleys for moving the belt through the apparatus, pressure means for urging the films to be sealed against one face of the belt, a rib narrower than the belt extending around the periphery of one of the pulleys for contacting and supporting the belt, heating means in said pulley for raising the temperature of the rib whereby the central portion only of the belt and the films in contact therewith are raised to the sealing temperature, a heating shoe having a rib narrower than the belt positioned next to the heated pulley whereby to maintain the central portion only of the belt and the films in contact therewith at the sealing temperature, and a rotatable roll dipping into a trough of cooling liquid and contacting the face of the belt opposite the face of the belt contacted by the films at a point after the belt leaves the heated shoe whereby the movement of the belt will cause the roll to rotate to carry liquid from the trough to the belt for cooling the films quickly.

8. Apparatus for heat sealing thin films, comprising an endless flexible metallic belt, a pair of pulleys around which the belt is trained, driving means for at least one of said pulleys for moving the belt through the apparatus, pressure means for urging the films to be sealed against one face of the belt, a rib narrower than the belt extending around the periphery of one of the pulleys for contacting and supporting the belt, heating means in said pulley for raising the temperature of the rib whereby the central portion only of the belt and the films in contact therewith are raised to the sealing apparatus, a heating shoe having a rib narrower than the belt positioned next to the heated pulley whereby to maintain the central portion only of the belt and the films in contact therewith at the sealing temperature, a rotatable roll dipping into a trough of cooling liquid and contacting the face of the belt opposite the face of the belt contacted by the films at a point after the belt leaves the heated shoe whereby the movement of the belt will cause the roll to rotate to carry liquid from the trough to the belt for cooling the films quickly, and a rotatable roll dipping into a trough of material to which the heated films will not adhere and contacting the face of the belt contacted by the films at a point before the films contact the belt whereby the movement of the belt will cause the roll to rotate to carry the material from the trough to the belt.

9. Apparatus for heat sealing thin films, comprising an endless flexible metallic belt, a pair of pulleys around which the belt is trained, driving means for at least one of said pulleys for moving the belt through the apparatus, pressure rolls for urging the films to be sealed against one face of the belt, a rib narrower than the belt extending around the periphery of one of the pulleys for contacting and supporting the belt, heating means in said pulley for raising the temperature of the rib whereby the central portion of the belt and the films in contact therewith are raised to the sealing temperature, a heating shoe having a rib narrower than the belt positioned next to the heated pulley whereby to maintain the central portion only of the belt and the films in contact therewith at the sealing temperature, said shoe being contoured to fit closely against said pulley and being positioned higher than the said pulley so as to remain in positive contact with the belt, a rotatable roll dipping into a trough of cooling liquid and contacting the face of the belt opposite the face of the belt contacted by the films at a point after the belt leaves the heated shoe whereby the movement of the belt will cause the roll to rotate to carry liquid from the trough to the belt for cooling the films quickly, and a rotatable roll dipping into a trough of material to which the heated films will not adhere and contacting the face of the belt contacted by the films at a point before the films contact the belt whereby the movement of the belt will cause the roll to rotate to carry the material from the trough to the belt.

References Cited in the file of this patent

UNITED STATES PATENTS

| Number | Name | Date |
|---|---|---|
| 2,135,763 | Nicholson | Nov. 8, 1938 |
| 2,469,972 | Lowry et al. | May 10, 1949 |
| 2,542,900 | Chaffee | Feb. 20, 1951 |